United States Patent [19]

Stone

[11] Patent Number: 4,716,327
[45] Date of Patent: Dec. 29, 1987

[54] ELECTRIC MOTOR BEARING

[75] Inventor: Thomas W. Stone, Owosso, Mich.
[73] Assignee: Universal Electric Company, Owosso, Mich.
[21] Appl. No.: 927,521
[22] Filed: Nov. 5, 1986
[51] Int. Cl.[4] .............................................. H02K 5/16
[52] U.S. Cl. ...................................... 310/90; 384/207
[58] Field of Search ...................... 310/89, 90, 91, 42; 384/207, 208, 489

[56] References Cited

U.S. PATENT DOCUMENTS

| | | | |
|---|---|---|---|
| 2,044,380 | 6/1936 | Cobb | 384/489 |
| 3,412,270 | 11/1968 | Wacek | 310/90 |
| 3,463,949 | 8/1969 | Stone | 310/89 |
| 4,245,870 | 1/1981 | Punshon et al. | 310/90 |
| 4,603,273 | 7/1986 | McDonald | 310/90 |

Primary Examiner—Patrick R. Salce
Assistant Examiner—D. L. Rebsch
Attorney, Agent, or Firm—Barnes, Kisselle, Raisch, Choate, Whittemore & Hulbert

[57] ABSTRACT

An electric motor comprising a shell supporting a stator and end members rotatably supporting a rotor. The end members are fastened to the shell in a manner such that the end members are accurately positioned longitudinally of the shell and the center of the end member is accurately positioned relative to the axis of the shell. One end member includes an annular portion spaced from the periphery which extends axially outwardly, and a radially axially extending portion that extends axially inwardly. An annular bearing seat is fixed thereto and a roller bearing is interposed between the bearing seat and the shaft. The other end member is provided with an annular wall spaced from the periphery, and a radial wall which supports a self-aligning bearing. An external oil catcher cover frictionally engages the annular wall of one end member and extends radially inwardly into overlying relation with the self-aligning bearing. An external oil catcher cover frictionally engages the first annular portion of the other end member and extending radially inwardly into generally overlying relationship to the roller bearing.

5 Claims, 3 Drawing Figures

ELECTRIC MOTOR BEARING

This invention relates to electric motors and particularly to the frame or housing of an electric motor.

BACKGROUND AND SUMMARY OF THE INVENTION

In U.S. Pat. Nos. 3,567,973 and 3,732,616 there is disclosed an electric motor comprising a cylindrical shell encircling the stator of the motor and a pair of end members which have radially extending portions which engage abutting surfaces formed by notches on the ends of the shell which are accurately positioned longitudinally relatively to one another and relative to the axis of the shell. The shell is also formed with circumferentially spaced portions that are bent radially inwardly to engage the outer surface of the end member and retain the end members against axial movement. In such an arrangement, an accurate low cost motor is provided.

However in such a motor, the end member which supports the self-aligning bearing has riveted thereto the member that defines the spherical seat for the self-aligning bearing and the spherical seat portion projects beyond the general plane of the end member so that the length of the motor is extended. In addition, the end that supports the spherical bearing cannot be mounted in flush relationship with a housing or other member or device. Furthermore the bearing is rubber mounted and this creates problems in both heat transfer and in carrying side load. A further problem that sometimes occurs is difficulty in sealing.

Among the objectives of the present invention are to provide an improved motor of this general type which has a more compact design which incorporates a self lining bearing without extending the length axially of the motor.

In accordance with the invention, an electric motor comprising a shell supporting a stator and end members rotatably supporting a rotor. The end members are fastened to the shell in a manner such that the end members are accurately positioned longitudinally of the shell and the center of the end members is accurately positioned relative to the axis of the shell. One end member includes an annular portion spaced from the periphery which extends axially outwardly and a radially inner axially extending portion that extends axially inwardly. An annular bearing seat is fixed thereto and a roller bearing is interposed between the bearing seat and the shaft. The other end member is provided with an annular wall spaced from the periphery and a radial wall which supports a self-aligning bearing. An external oil catcher cover functionally engages the annular wall of one end member and extends radially inwardly into overlying relation with the self-aligning bearing. An external oil catcher cover frictionally engages the first annular portion of the other end member and extending radially inwardly into generally overlying relationship to the roller bearing.

DESCRIPTION

Figure 1:
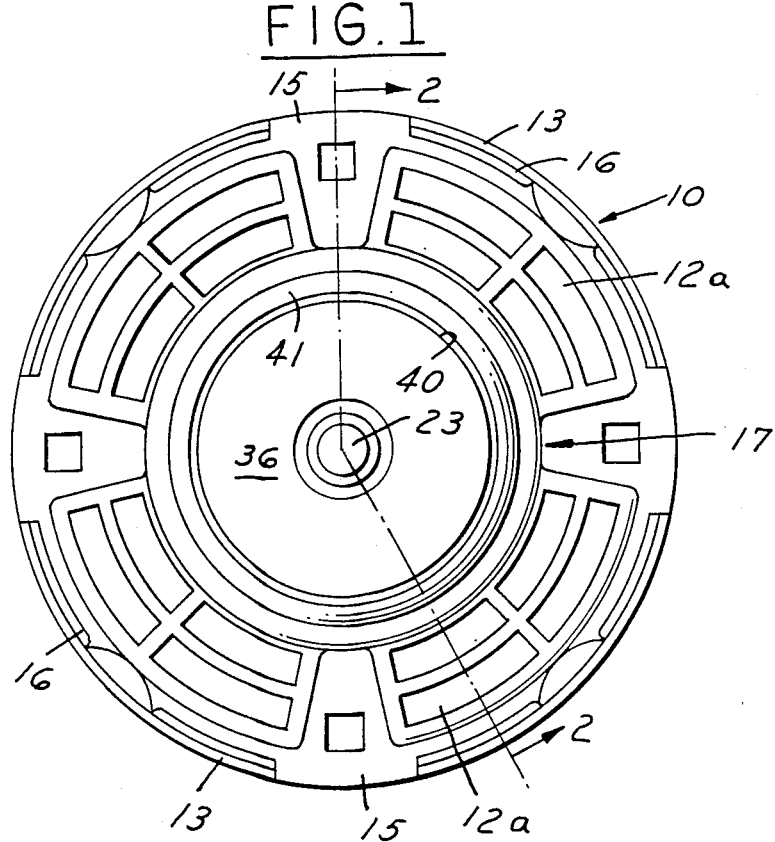
FIG. 1 is an end view of an electric motor embodying the invention.
Figure 3:
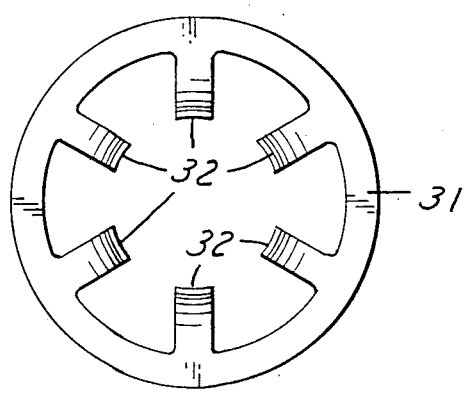
FIG. 3 is a plan view of a bearing spring utilized in the electric motor.
Figure 2:
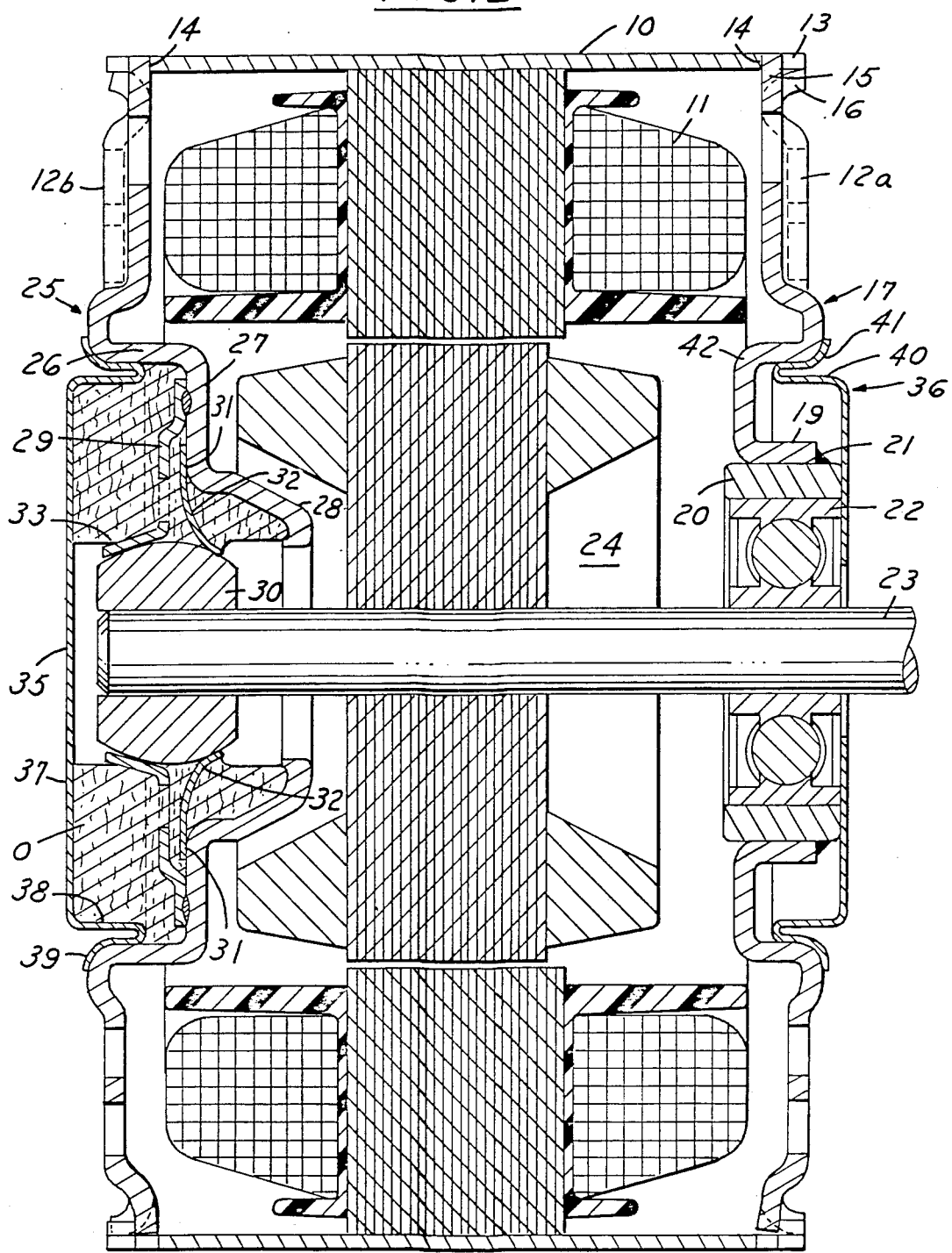
FIG. 2 is a sectional view on an enlarged scale taken along the line 2—2 in FIG. 1.

Referring to FIGS. 1–3, the electric motor embodying the invention comprises a cylindrical sheet metal shell 10 that supports a stator 11 and end members 12a, 12b. The shell 10 is formed with circumferentially spaced notches 13, the bases 14 of which define surfaces that are accurately positioned longitudinal relative to one another. Each end member 12a, 12b includes a plurality of radial portions 15 that engage the bases of the notches and an outwardly extending peripheral flange 16 that engages the inner surface of the shell.

One end member 12a further includes a first annular portion 17 in the form of a U-shaped cross-section extending axially outwardly and connected to a second annular portion 18 of U-shaped cross-section which extends axially inwardly and has a greater radial width than the portion 17. The inner wall 19 of the portion 18 supports a bearing seat 20 which is welded as at 21 to hold the bearing seat 20 in predetermined accurate relationship. This seat supports a roller bearing 22 which in turn supports one end of the shaft 23 on which the rotor 24 is fixed.

In accordance with the invention, the other end member 12b is formed with an annular outwardly extending portion 25 of U-shaped cross-section. The annular inner wall 26 of portion 25 extends axially inwardly and is connected to a radial portion 27 which, in turn, is connected to a generally axially inwardly extending portion 28. A bearing retainer 29 is welded to the portion 27 in accurate concentric relation to the axis of shell 10 and engages a spherical bearing 30 on the shaft 23. A spring retainer 31 is positioned adjacent wall portion 27 and has a plurality of radial fingers 32 which yieldingly engage the bearing 30 to hold it against the seat 33 defined by the member 29. Similar oil catcher covers 35, 36 are provided over the end members 12b, 12a respectively. Oil catcher cover 35 includes a closed base wall 37 and an annular axially extending wall 38 which in turn is connected to an annular finger 39 frictionally engaging the wall 36 to form an oil seal.

Oil retaining material O is applied on either side of the member 29. Such a material is porous and impregnated with oil and retains the oil for adequate lubrication. Such materials are well known in the art. For example, it may comprise oil impregnated felt segments or homogeneous oil soaked cellulose material which is injected in place like grease.

Similarly, oil cather cover 36 includes a wall 40 and spring portion 41 frictionally engaging the wall 42 of the annular portion 17. Oil catcher 36 is formed with an opening.

It can thus be seen that the system utilized with the self-aligning bearing 30 functions to provide a flat profile, since the bearing is displaced axially inwardly, leaving space for a mechanical seal external catcher 35. This is significant both from the cost to the manufacturer and from a reliability standpoint, since none of the hand sealing operations heretofore performed by manufacturers can be effective as the mechanical seal. The motor thus can have both a self-aligning and a ball bearing interchangeably utilizing the same oil catcher. The outward appearance of the motor is not changed by the type of bearing used.

The construction further provides advantages in the painting. Where a motor housing incorporates welding, it cannot be painted without adversely affecting the subsequent welding. Painting after welding results in an inability to seal the motor. The present construction permits welding functions to take place in the unpainted portions of the end member assembly with the oil catcher covers, being external, completely enclosing the area. This solves both the painting and sealing problems.

I claim:

1. An electric motor comprising
a sheet metal shell having an axis,
a stator supported by said shell,
a shaft,
a rotor mounted on said shaft,
longitudinally spaced end members,
said end members being fastened to the shell in a manner such that the end members are accurately positioned longitudinally of the shell and the center of the end members is accurately positioned relative to the axis of the shell,
one of said end members rotatably supporting a portion of said shaft,
the other of said end members comprising a sheet metal member having an axially inwardly extending portion, an unpainted radial portion connected to the axial portion and a generally axially inwardly extending portion,
a bearing on said shaft,
a spring retainer engaging said radial portion of said other end member and having a plurality of radial fingers yieldingly engaging said bearing,
a bearing retainer welded to said unpainted radial portion of said end member, and defining a seat engaging said bearing,
an external oil catcher cover frictionally engaging the annular wall of said other end member and extending radially inwardly into overlying relation with said bearing member, and
oil retaining material positioned between said oil catcher cover and said bearing retainer and between said bearing retainer and said spring retainer and between said spring retainer and said generally axially inwardly extending portion of said end member.

2. The electric motor set forth in claim 1 wherein said oil catcher cover comprises a base wall extending generally radially, a first annular wall extending axially inwardly of the motor, and a second annular wall spaced from said first wall and extending radially outwardly of the electric motor and comprising the wall which frictionally engages the end member.

3. The electric motor set forth in claim 1 wherein said one end member includes an annular portion extending axially inwardly and a portion extending radially outwardly,
an annular bearing seat fixed on said portion,
a roller bearing interposed between the bearing seat and the shaft, and
an external oil catcher cover frictionally engaging the first annular portion of one end member.

4. An electric motor comprising a sheet metal shell having an axis, a starter, supported by said shell, a shaft, a rotor mounted on said shaft, longitudinally spaced end members, said end members being fastened to the shell in a manner such that the end members are accurately positioned longitudinally of the shell and the center of the end members is accurately positioned relative to the axis of the shell, one of said end members rotatably supporting a portion of said shaft, the improvement wherein the other of said end members comprises a sheet metal member having an axially inwardly extending portion, an unpainted radial portion connected to the axial portion and a generally axially inwardly extending portion,
a bearing on said shaft,
a spring retainer engaging said radial portion of said other end member and having a plurality of radial fingers yieldingly engaging said bearing,
a bearing retainer welded to said unpainted radial portion of said end members and defining a seat engaging said bearing,
an external oil catcher cover frictionally engaging the annular wall of said other end member and extending radially inwardly into overlying relation with said bearing, and
oil retaining material positioned between said oil catcher cover and said bearing retainer and between said bearing retainer and said spring retainer and between said spring retainer and said generally axially inwardly extending portion of said end member.

5. The other end member set forth in claim 4 wherein said oil catcher cover comprises a base wall extending generally radially, a first annular wall extending axially inwardly of the motor, and a second annular wall spaced from said first wall and extending radially outwardly of the electric motor and comprising the wall which frictionally engages the end member.

* * * * *